United States Patent [19]

Phillips et al.

[11] Patent Number: 4,503,126
[45] Date of Patent: Mar. 5, 1985

[54] METHOD OF MAKING AN ABRASION RESISTANT COATING ON A SOLID SUBSTRATE AND ARTICLES PRODUCED THEREBY

[75] Inventors: Richard A. Phillips, Acton; Theodore A. Haddad, Leominster, both of Mass.

[73] Assignee: Foster Grant Corporation, Leominster, Mass.

[21] Appl. No.: 570,471

[22] Filed: Jan. 13, 1984

Related U.S. Application Data

[63] Continuation-in-part of Ser. No. 439,094, Nov. 4, 1982, abandoned, which is a continuation-in-part of Ser. No. 409,272, Aug. 18, 1982, Pat. No. 4,435,476.

[51] Int. Cl.$^3$ .................. B05D 3/06; B32B 27/12; B32B 27/30; B32B 13/08
[52] U.S. Cl. .................. 428/412; 427/39; 427/41; 427/40; 427/44; 428/447; 428/450; 428/474.4; 428/480; 428/522; 428/532
[58] Field of Search .............. 427/39, 40, 41, 387, 427/44; 428/412, 447, 450, 474.4, 480, 522, 532

[56] References Cited

U.S. PATENT DOCUMENTS

| | | | |
|---|---|---|---|
| 3,179,546 | 4/1965 | Fisher | 428/447 |
| 3,451,838 | 6/1969 | Burzynski | 117/33.3 |
| 3,632,386 | 1/1972 | Hurst | 427/40 |
| 3,650,808 | 3/1972 | Gagnon | 117/72 |
| 3,669,720 | 6/1972 | Remer | 427/40 |
| 3,686,018 | 8/1972 | Lindblom | 427/40 |
| 3,713,880 | 1/1973 | Krekeler | 117/138.8 B |
| 3,843,399 | 10/1974 | Kaplan | 117/217 |
| 3,901,994 | 8/1975 | Mehalso | 428/16.3 |
| 3,953,115 | 4/1976 | French | 351/166 |
| 3,986,997 | 10/1976 | Clark | 260/37 |
| 4,018,945 | 4/1977 | Mehalso | 427/41 |
| 4,072,985 | 2/1978 | Kaganowicz | 358/128 |
| 4,096,315 | 6/1978 | Kubacki | 428/412 |
| 4,123,308 | 10/1978 | Nowlin | 156/272 |
| 4,137,365 | 1/1979 | Wydeven | 428/412 |
| 4,225,631 | 9/1980 | Berger | 427/54.1 |
| 4,277,287 | 7/1981 | Frye | 106/287.12 |
| 4,298,655 | 11/1981 | Kray | 428/412 |

FOREIGN PATENT DOCUMENTS

| | | | |
|---|---|---|---|
| 4506433 | 4/1970 | Japan | 427/41 |
| 1839 | 1/1980 | Japan . | |
| 816024 | 7/1959 | United Kingdom . | |

*Primary Examiner*—Ellis P. Robinson
*Attorney, Agent, or Firm*—Tatsuya Ikeda; Hugh C. Crall

[57] ABSTRACT

There is disclosed a method for providing an improved abrasion resistant coating on solid substrates such as plastic articles and solid articles prepared thereby having on the surface such abrasion resistant coating. A solid substrate is coated with an organosilanol-type coating liquid comprising organosilanol molecules, or a precursor thereof or a partial condensation product thereof. At least 90 mole percent of said organosilanol molecules are trifunctional silanol molecules of the formula $RSi(OH)_3$, R being a hydrocarbon radical, and at least 50 mole percent of said trisilanols being an alkyl trisilanols of 1-3 carbon atoms or phenyl trisilanol. Preferably, at least 70 mole percent of the trisilanol is methyltrisilanol. After the coating is cured by a conventional means, it is post-treated by an electron beam irradiation to afford an abrasion resistance far superior to that obtained from organosilanol coating liquids without electron beam irradiation post-treatment.

20 Claims, No Drawings

METHOD OF MAKING AN ABRASION RESISTANT COATING ON A SOLID SUBSTRATE AND ARTICLES PRODUCED THEREBY

This is a continuation-in-part application of the copending application Ser. No. 439,094, filed Nov. 4, 1982, now abandoned which is a continuation-in-part of an application Ser. No. 409,272, filed Aug. 18, 1982 now U.S. Pat. No. 4,435,476.

BRIEF SUMMARY OF THE INVENTION

This invention relates to an improved scratch or abrasion resistant coating for a solid substrate and more particularly to such coatings for transparent plastic substrates. The invention also includes a method for providing an improved abrasion resistant coating which comprises coating the substrate with an organosilanol coating liquid, curing the coating, and then subjecting the coated substrate to an electron beam irradiation.

BACKGROUND ART

There are a large number of references relating to the preparation of an abrasion-resistant coating on a solid substrate such as a plastic material. In light of the various advantages of plastic materials such as light weight, low material cost and ease of shaping, the development of abrasion-resistant coatings for plastic materials is highly significant from a commercial standpoint. Included among those methods commonly used for such a purpose are a group of methods where a liquid coating composition is applied to a solid substrate and another group of methods where a coating layer is prepared by use of a plasma polymerization of a monomer onto the surface of a solid substrate. Various liquid coating compositions suitable for the first group of methods and various monomers suitable for plasma polymerization have been disclosed in the past. There also exist references relating to the post-treatment of a coated layer which improves or modifies the surface properties thereof.

Burzynski et al, U.S. Pat. No. 3,451,838 describes a process of coating plastics with an organosiloxane. It discloses that abrasion resistant organopolysiloxane compounds can be prepared by the hydrolysis and condensation of at least one compound embraced by the general formula $T_nSiZ_{4-n}$ where each T is independently a hydrocarbon radical such as alkyl, alkenyl and aryl and each Z is independently a hydrolyzable group such as halogen, acyloxy and aryloxy.

Krekeler, U.S. Pat. No. 3,713,880 describes a process for coating the surface of transparent thermoplastic resins with a solution of a mixture of alkyl silicate, an organosilane and an antistatic additive and thereafter subjecting the coated material to a heat treatment, said organosilane being a compound of the formula $RSiX_3$, $R_2SiX_2$ or a mixture thereof, where R is a hydrocarbon radical and X is a hydrolyzable group, namely, a halogen or a lower alkoxy group.

Gagnon, U.S. Pat. No. 3,650,808 describes a process for providing an abrasion resistant coating on a polycarbonate surface which comprises priming the polycarbonate surface with a compound of the formula $H_2NR_1Si(OR)_3$ where $R_1$ is an alkylene group, and OR is an alkoxy group of 1-4 carbon atoms, and thereafter applying to the surface a coating liquid which is produced by heating methyltrialkoxysilane or a mixture of methyl trialkoxysilane and phenyltrialkoxysilane followed by a followed by a partial condensation thereof.

Clark, U.S. Pat. No. 3,986,997 discloses a pigment-free aqueous coating composition comprising a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

French, U.S. Pat. No. 3,953,115 describes a process for applying an adherent, optically clear, abrasion resistant coating to plastic ophthalmic substrates which comprises (a) forming a partially hydrolyzed solution of a vinyltri(loweralkoxy)silane in a water-miscible volatile organic solvent, the silane concentration being 25-75% by weight, (b) applying a thin, uniform coating of the partially hydrolyzed solution to a clean surface of the ophthalmic lens; (c) maintaining the coated substrate in a high humidity and preferably elevated temperature environment until the silane is substantially completely hydrolyzed; and (d) dehydrating (curing) the coated substrate under low humidity conditions at an elevated temperature.

Frye, U.S. Pat. No. 4,277,287 describes an organosiloxane liquid coating comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, and a small amount of a polysiloxane polyether copolymer, at least 70 weight percent of the silanol being $CH_3Si(OH)_3$, said composition containing 10 to 50 weight percent solids.

Kray, U.S. Pat. No. 4,298,655 describes an organosiloxane coating liquid comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, a small amount of a beta-dicarbonyl compound, at least 70 weight percent of the silanol being $CH_3Si(OH)_3$, said composition containing 10 to 50 weight percent solids.

Suzuki et al, Japan Patent 1839/1980 describes a method of surface treatment of articles wherein the hydrolysis product of a silicon compound having a general formula $R^1C(=CH_2)C(=O)OR^2Si(OR^3)_3$ (where $R^1$ is hydrogen or methyl, $R^2$ is an alkylene group of 1–6 carbon atoms, and $R^3$ is a hydrocarbon group of 1–8 carbons or an acyl group of 1–4 carbons) is coated on a substrate and thereafter it is hardened by electron beam irradiation. Electron beam irradiation is commonly used, as is ultraviolet light, to cure coatings containing carbon-carbon double bonds. The inventors state that in order to eliminate the polymerization inhibitive effect of oxygen gas, it is preferable to conduct the electron beam irradiation under an inert gas atmosphere. The inventors state that the hardening of the coating is believed to be due to the polymerization of acrylate or methacrylate groups (namely, carbon-carbon double bonds) effected by the electron beam irradiation. The inventors state that the electron beam used in their invention is a beam of electron having an acceleration energy of 0.3–3 NeV [SIC, NeV?] emitted from various electron accelerators such as Van de Graaff type, Cockcroft type, Cockcroft-Walton type, insulated iron core type, Dynamitron type, resonance transformer type, and linear type. It is noticed that this type of electron beam has a very high kinetic energy.

Ishikawa, Japan Patent Publication No. SHO 46-534 (1971) describes a method of making an $SiO_2$ film by Townsend discharge wherein a pair of electrodes is provided within a vacuum apparatus, a sample is placed on one or both of the electrodes or between the electrodes, and organo-oxy silane or a mixture of organo-oxy silane and oxygen gas is introduced to the system and the discharge is conducted at an electric field of not more than 1000 V/cm, a gas pressure of not more than 10 mm Hg and a sample temperature of not more than 600° C.

In the Ishikawa patent the $SiO_2$ film precipitates from vapor phase. This method is different from electric discharge post-treatment or electron beam post-treatment of a pre-existing solid surface.

Berger et al, U.S. Pat. No. 4,225,631, describes a process for making an abrasion resistant coating on a polymeric substrate which comprises applying a coating solution of partially hydrolyzed vinyltri(lower alkoxy)silane in a water miscible volatile organic solvent, curing the coated substrate, and subsequently subjecting the cured substrate to ultraviolet radiation. In the Berger et al patent, it is required that the silicon-containing monomer be an unsaturated compound, more specifically, that the monomer molecule have a vinyl group directly attached to the silicon atom. Namely, it is an essential requirement in the Berger method that the main ingredient of the starting coating composition be a trifunctional silane monomer having a vinyl group attached to the silicon atom. The Berger method relies on the ultraviolet-induced cross-linking of the vinyl groups to produce a harder coating and a better chemical adhesion between the coating and the substrate.

The term "trifunctional" as used herein signifies that the central silicon atom has three groups attached thereto which are hydroxy groups or groups hydrolyzable to hydroxy groups such as alkoxy groups or halogens. People skilled in the art also use terms tetrafunctional, difunctional and monofunctional silane monomers. They have the corresponding meanings. For a more detailed explanation of said terms as well as the chemistry of silicon, particularly the chemistry of siloxanes, the reader is referred to standard treatises such as Rochow, "An Introduction to the Chemistry of Silicon", 2nd Ed., John Wiley, New York (1951).

When all of the three OH groups of an organo-trisilanol $RSi(OH)_3$ undergo condensation with OH groups attached to other silanol molecules, the trifunctional silanol gives rise to a trifunctional structural unit (T unit) of polysiloxane network. Said T unit can be depicted by the formula

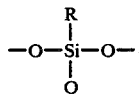

Similarly, a difunctional silanol of the formula $R_2Si(OH)_2$ gives rise to a difunctional structural unit of polysiloxane network, and the tetrafunctional silanol $Si(OH)_4$ gives rise to a tetrafunctional structural unit of polysiloxane network. Said difunctional structural unit (D unit) and tetrafunctional structural unit (Q unit) can be depicted respectively by the formulas

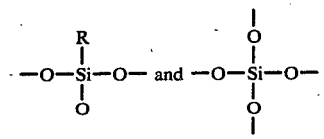

In the above three formulas, each unit includes half of each associated oxygen atom. Needless to say, difunctional silanol gives rise primarily to a linear siloxane chain, whereas trifunctional silanol gives rise to a cross-linked siloxane network.

It is well known in the art that organosiloxane hard coatings are prepared generally from organosilanol liquid compositions whose main ingredient is trifunctional organosilanol or a partial condensate thereof, whereas softer materials such as siloxane release agents are prepared generally from organosilanol compositions whose main ingredient is difunctional organosilanol.

Quite often, organosilanol molecules are formed by virtue of the in-situ hydrolysis of the corresponding hydrolyzable organosilane molecules, such as alkoxy substituted organosilane molecules. The in-situ formed organosilanol molecules present in the coating liquid usually undergo some degree of condensation before the coating liquid is applied to the substrate. In order to avoid repetition, all three forms shall be deemed equivalent to each other for the purpose of describing this invention. Thus, the term organosilanol as used in the specification and the appended claims shall subsume the precursor and the partial condensation product thereof. Precursors of tetrasilanols are not included within the definition of an organosilanol since they hydrolyze to a completely inorganic molecule.

Kaplan et al, U.S. Pat. No. 3,843,399 describes a metalized video disc having an insulating layer thereon, where glow discharge is employed to coat the conductive video disc with a polymeric film to obtain a uniform tough dielectric coating which can be repeatedly contacted with a metal tipped stylus without damage. It is stated that monomers suitable for use in forming thin coatings on video discs by glow discharge polymerization include styrene; substituted styrenes; alkyl-substituted silanes such as triethylsilane, trimethylsilane; tetraethylsilane, vinyltrimethylsilane and the like; alkenes and cycloalkenes; alkene-substituted benzenes such as divinylbenzene and the like; halogenated compounds such as tetrafluoroethylene, methylene chloride and the like; and polysiloxanes such as dimethylpolysiloxane and the like.

Mehalso, U.S. Pat. No. 4,018,945 describes a method of improving the long term durability of a dielectric polymer film deposited on a video disc by glow discharge polymerization of a dielectric polymer precursor such as styrene, wherein the dielectric polymer is post-treated by a glow discharge in the presence of an oxygen containing gas.

Mehalso et al, U.S. Pat. No. 3,901,994 describes a metalized disc having a dielectric coating thereon wherein a poly-p-xylylene coating is deposited on the metalized disc by a technique such as vapor deposition and then hardened by exposure to a glow discharge.

Kaganowicz et al, U.S. Pat. No. 4,072,985 describes a video disc having a dielectric layer formed from styrene in a nitrogen atmosphere in a glow discharge. It is stated that the dielectric layer has improved age deterioration resistance, wear characteristics and adhesion to a metal conductive layer. This is an example of plasma polymerization.

Nowlin et al, U.S. Pat. No. 4,123,308 describes a process for chemically bonding a poly-p-xylylene to a thermosetting resin, wherein a low temperature plasma is employed to chemically modify the surface of the poly-p-xylylene to incorporate oxygen atoms into the backbone of the polymer at its surface.

Wydeven et al, U.S. Pat. No. 4,137,365 describes an oxygen plasma post-treatment of plastic surfaces coated with plasma polymerized silane monomer wherein a plastic surface is first coated with a polymerized organosilane by use of a plasma polymerization technique conducted in vapor phase and then the coated material is post-treated with an oxygen plasma. It is stated that such oxygen plasma treatment of the coating improves its abrasion resistance.

The Wydeven et al disclosure is directed to a situation where the silane coating is prepared by a plasma polymerization of polymerizable organosilane monomer having sufficient vapor pressure to conduct polymerization in vapor phase. As examples of organosilanes suitable for their invention, there are mentioned in the patent vinyltrichlorosilane, tetraethoxysilane, vinyltriethoxysilane, hexamethyldisilazane, tetramethylsilane, vinyldimethylethoxysilane, vinyltrimethoxysilane, tetravinylsilane, vinyltriacetoxysilane, and methyltrimethoxysilane. Wydeven et al show that the oxygen-plasma post-treatment incorporates oxygen atoms to the polymer treated. There is no teaching in the patent as to plasma treatment of coating obtained from liquid compositions comprising organosiloxane compounds such as the composition described in the aforementioned Clark, French or Kray patents. In fact the inventors teach against using liquid "dip" coating composition within the scope of their invention because of problems in controlling the film thickness which in turn affects abrasion resistance and optical properties.

Kubacki, U.S. Pat. No. 4,096,315 describes a process for coating an optical plastic substrate which comprises steps of exposing the substrate to a first plasma that forms hydroxyl groups on said substrate's surface, exposing the substrate to a plasma polymerization using a silicon containing monomer, and exposing the substrate to another plasma treatment in the presence of a gas selected from noble gases, oxygen, nitrogen or air. As examples of suitable silicon containing monomers to be used in the plasma polymerization step, there are mentioned in the patent vinyltrimethylsilane, vinyltrimethylethoxysilane, vinyldimethylethoxysilane and hexamethyldisilizane.

In Chapter 4 of a treatise entitled "Thin Film Process", edited by Vossen and Kern, Academic Press, New York (1978), Yasuda comments on the chemistry involved in the plasma polymerization of three types of hydrocarbon molecules namely, triple-bond-containing and aromatic compounds (Group I), double-bond-containing and cyclic compounds (Group II), and compounds without the aforementioned structures (Group III). The author states that under glow discharge polymerization conditions Group I forms polymers by utilizing the opening of triple bonds or aromatic structures with the least evolution of hydrogen gas, that Group II forms polymers via both the opening of double bonds or cyclic structures and hydrogen abstractions, the production of hydrogen gas being considerably higher than Group I compounds, and that Group III compounds polymerize primarily by hydrogen abstraction, hydrogen production being much higher than in those in Group II compounds. Based on this explanation of the plasma polymerization process, it follows that when a vinyl-group-containing silane monomer such as vinyl trimethoxysilane, vinyltriethyoxysilane or vinyldimethethoxysilane is plasma polymerized, a substantial amount of carbon-carbon polymer backbone will be formed rather than siloxane type bonds.

Hurst, U.S. Pat. No. 3,632,386 describes an oxidative treatment, e.g., electric discharge (corona) or flame treatment of a silicone polymer release surface prepared from a silicone polymer release agent such as solvent-soluble liquid or solid curable silicone rubber polymers, whereby the release properties of the silicone polymer surface is reduced. It is stated in the patent that usually, the silicone polymer release agents are believed to have the formula:

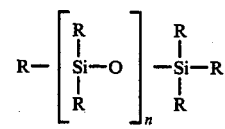

R being a mono-valent hydrocarbon radical, thus indicating that the silicon-containing polymer is substantially linear without any appreciable extent of cross-linking. The Hurst patent is not directed to abrasion resistant coatings and nothing is mentioned in the patent about the abrasion resistance of the coated surface.

The aforementioned prior art references can be broadly classified into (1) those relating to organosiloxane-type liquid coatings, (2) those relating to plasma polymerization of organosilane monomers, (3) those relating to plasma polymerization of organic monomers such as xylene and styrene (4) those relating to the plasma treatment of certain types of coated substances, namely, plasma polymerized organosilanes, plasma polymerized hydrocarbons such as xylene and styrene, and linear silicone rubber type polymers and (5) post-treatment of carbon-carbon double bonds remaining in the coated material either with UV light or with an electron beam having a kinetic energy of mega volts range. None of the aforementioned references are directed to an electron beam post-treatment of organosiloxane coating obtained by applying an "organosilanol coating liquid" as defined in this invention to a solid substrate in order to improve its abrasion resistance. The term "post" as used herein shall mean subsequent to the curing of the coated material by a conventional means such as drying and/or heating.

The "organosilanol coating liquid" composition used in this invention comprises as a main ingredient organosilanol molecules, at least 90 mole percent of the organosilanol molecules being trifunctional organosilanol molecules of the formula $RSi(OH)_3$, or a precursor thereof or a partial condensation product thereof, where R is a hydrocarbon radical, and at least 50 mole percent of said trifunctional organosilanols being an alkyltrisilanol having one to three carbon atoms, preferably one, or phenyltrisilanol. More preferably at least 70 mole percent of the trisilanol should be methyltrisilanol. Thus, there may be present a minor amount of other organosilanol molecules such as difunctional organosilanol molecules, a precursor thereof or a partial condensation product thereof.

The coating liquid composition used in this invention may contain other ingredients. A typical example of such other ingredients is colloidal silica or tetrasilanol or its precursor. See for instance the afore-mentioned Clark, Frye and Kray patents. Usually the colloidal silica is dispersed in a lower aliphatic alcohol-water solution of the partial condensate of organosilanol molecules. Suitable examples of such lower aliphatic alcohol includes methanol, ethanol, isopropanol and t-butanol. Isopropanol is particularly preferred. Needless to say, mixtures of such alcohols can be used. Optionally, minor amounts of other water-miscible polar solvents such as acetone may be present in the coating liquid.

The term "organosilanol coating liquid" as used in connection with the instant invention shall mean the coating composition as defined above dispersed or dissolved in a suitable medium. Examples of such coating liquids are disclosed in various references, for instance, Clark U.S. Pat. No. 3,986,997, Frye U.S. Pat. No. 4,227,287 and Kray U.S. Pat. No. 4,298,655. The disclosures of these three references are hereby incorporated by reference. The term "organosiloxane coating" as used in connection with the instant invention shall mean an abrasion resistant coating prepared from said organosilanol coating liquid.

In the past it has been very difficult, if not impossible, to obtain plastic articles having abrasion resistance anywhere near the abrasion resistance of common glass. As a point of reference in discussing and evaluating the advantages of this invention the following typical abrasion resistance values as measured by a rubbing pad abrader instrument in terms of the number of the cycles of an abrasive motion exerted on the surface of the test piece necessary to bring about an increase of 3% absolute in the haze value of the test piece which is expressed as a percent of scattered light in the light transmitted through the test piece. Three percent haze is the level at which haze in a lens becomes noticeable and objectionable to consumers. Details of the testing method used to evaluate the abrasion resistance of materials are described later in the specification.

TABLE I

| ABRASION RESISTANCE OF COMMON MATERIALS | |
|---|---|
| Material | Cycles for 3% Increase Haze |
| Polycarbonate | 7–11 |
| Acrylic resin | 14–19 |
| Allyl diglycol carbonate resin (CR-39 resin) | 125–150 |
| Glass | 3000–6000 |

The abrasion resistance of coated plastic articles obtained according to this invention is much larger than the abrasion resistance of coated plastic articles obtained by the conventional method comprising the application of an organosilanol type coating liquid but not an electron beam post-treatment.

DISCLOSURE OF THE INVENTION

There is described solid substrates having thereon an improved abrasion resistant coating sometimes called a "hard-coat" and a method of providing an improved abrasion resistant coating on various solid substrates. Substrates such as plastics, metals and woods can be treated according to this invention. Examples of plastic materials that can be improved and treated by the inventive method include allyl diglycol carbonate resins (CR-39 resins), polycarbonates, acrylic resins, polystyrene, polyamides, polyesters and polyvinylchloride.

The method of this invention comprises first coating the article with an organosilanol coating liquid as defined above, curing the coating in order to form an organosiloxane coating presumably by virtue of extensive crosslinking between OH groups, and further treating the cured coating with an electron beam irradiation in order to enhance its abrasion resistance. The method of this invention is useful, for instance, for preparing improved abrasion resistant spectacle lenses and plastic sheets. The electron beam irradiation is typically conducted with an acceleration voltage of kilovolts range at a preferred pressure of the order of $10^{-6}$ torr. The irradiation time varies widely depending upon various factors such as acceleration voltage, current, etc. but typically it is from about one minute to about 20 minutes.

It has been discovered that the method of this invention affords a highly abrasion-resistant coating on solid substrates such as plastic lenses, the abrasion resistance approaching that of a common glass. The term "lens" is used in this specification in a broad sense in that the "lens" may not have a vision-corrective effect, and in fact so-called sunglass lenses usually do not have any vision-corrective effect, the primary optical effect being light filtering. It has been discovered that there is no need for the starting silicon-containing monomer molecule to have a vinyl group directly attached to the silicon atom and that, for instance, a coating composition comprising primarily organosilanol molecules of the formula $CH_3Si(OH)_3$, a precurser or a partial hydrolysis product thereof is quite satisfactory for the purpose of this invention. It has been discovered that when an organosiloxane type coating is prepared from organosilanol type monomers having no vinyl group attached to the silicon atom, the ultraviolet irradiation of the coating does not appreciably enhance the abrasion resistance, but electron beam irradiation thereof affords a surprisingly great enhancement of the abrasion resistance.

DETAILS OF THE INVENTION

The method of this invention for producing an improved abrasion resistant coating comprises coating a solid substrate with an organosilanol coating liquid as defined above, curing said liquid by a conventional means, and subjecting the coated substrate to an electron irradiation post-treatment. The abrasion resistance of the coated articles obtained by this invention is much higher than the abrasion resistance obtained by the prior art method involving the application to a solid substrate of an organosilanol coating liquid and a conventional curing thereof but not an electron beam post-treatment of the coated layer.

As used in this invention the term "organosiloxane coating" or "organosiloxane coat" is intended to mean an abrasion resistant coating comprising siloxane bonds (namely, $(Si-O-Si)_n$ bonds) formed by the condensation reaction between organosilanol molecules. The organosilanol molecules can generally be obtained from organosilane compounds having one or more hydrolyzable groups attached to silicon atom such as alkoxy, acyloxy, aryloxy or halogen, but they are usually obtained by the hydrolysis of the corresponding alkoxy-group-containing organosilanes.

Any standard method of applying the liquid coating composition may be used in the practice of this invention. Examples of such methods are flow coating, dip coating, spray coating, spin coating, etc.

A common method of applying such liquid coating compositions to substrates is to immerse the articles in the liquid composition and thereafter withdraw them from the bath at a predetermined rate. It is usually advantageous to thoroughly clean the substrate surface prior to the application of the coating liquid in order to obtain better coatings. Conventional cleaning liquids such as aqueous detergent solutions and volatile fluorocarbons may be used for this purpose. After withdrawal from the bath, the articles are carefully dried in a dust-free atmosphere and thereafter thermally or U.V. cured. Thermal curing is usually conducted at an elevated temperature such as in the range of 50°–200° C. depending upon the heat distortion temperature of the substrate. This coating method is commonly called "dip-coating" and it is very suitable for a large scale production of hard-coated plastic articles. The dip-coating method is generally more suitable than plasma polymerization for large scale production of plastic hard coat articles for various reasons including process costs and equipment coats. A typical thickness of a coating layer obtained by dip-coating method is about 1–3 microns.

Plastic substrates suitable for the method of this invention include aliphatic and aromatic polycarbonates such as allyl diglycol carbonate and poly(bisphenol-A carbonate), acrylic resins such as poly(methylmethacrylate), polystyrene, polyamide, polyesters and cellulose esters such as cellulose acetate butyrate (CAB). For sunglass applications polycarbonate, allyl diglycol carbonate, cellulose ester and acrylic resins are particularly suitable.

The general technique of electron beam irradiation is well-known in the art. Such a technique is used in various applications such as television screens. Usually electrons are emitted thermally from an electron emitting material such as tungsten maintained at a high temperature. The electrons are accelerated by applying a voltage thereto and they are focused into a beam by use of a focusing device such as an electric field and/or a transverse magnetic field. The sweeping of electron beams, if necessary, can be accomplished by a simple procedure, for instance, by varying magnetic field. Although in some cases electron beam irradiation is conducted in ambient atmosphere wherein the article to be treated is exposed to atmosphere and the electron beam emitted from, for instance, a filament surrounded by an inert gas travels through atmosphere for a short distance and impinges upon the article, it is preferable to conduct electron beam irradiation under a high vacuum in this invention. Thus the electron beam source is usually placed within a vacuum chamber and the chamber is maintained at a high vacuum, for instance, $10^{-6}$ torr. The acceleration voltage varies over a wide range depending upon the particular instrument. It has been found in this invention, however, that a relatively moderate acceleration voltage of kilovolts range, namely, from about 1 to about 20 kilovolts is suitable. The conditions for the electron beam post-treatment should be adjusted in order to obtain a sufficient increase of the abrasion resistance without accompanying other undesirable phenomena such as discoloration or deformation of the article. Thus, various experimental parameters such as acceleration voltage, current and irradiation time are intimately interrelated to each other in selecting suitable conditions for the electron beam post-treatment. It has been found that when the acceleration voltage is in kilovolts range, the current is less than about 10 mA. Under a typical experimental condition of 5.5 kilovolts of acceleration voltage and 10 mA current, an irradiation time of a few minutes has been found suitable.

Abrasion resistance of a plastic is an important property in various applications such as sunglass lenses and glazing. Abrasion resistance of a surface may be evaluated in many ways. In the area of sunglass lenses a common practice is to place on a convex surface of a sunglass lens an object having a concave surface which matches the convex surface of the lens. An abrasive powder is placed between the two surfaces and the concave surface is made to reciprocate around a vertical axis under a prescribed weight load. This simulates wiping a lens with a cloth containing dust or dirt particles which is the main cause of scratches in sunglass or ophthalmic lenses. Generally as the number of cycles increases, the extent of haze formation on the surface also increases. A common procedure is to express results of the test in terms of percent increase in haze after a certain number of cycles.

In the sunglass and opthomalic industry the above abrasion resistance test is conducted using devices known as a rubbing pad abrader and a hazemeter. A detailed description of the test (hereinafter called the "rubbing pad abrader test") used in this application is as follows:

ABRADER DESCRIPTION

The rubbing pad abrader consists of 1/20 H.P. AC motor, coupled to a Zeromax variable speed transmission which is joined by means of an adjustable eccentric joint, steel rod and two ball joints to a moveable steel table in a sliding fit holder. The steel table is attached to the stroking arm through a ball joint and the other end of the stroking arm is fitted with a ball joint and pin. The pin carries the loading weight (100 grams) on one end and the abrading pad holder on the other end. The pad holder with the abrading pad in place (pads received are self-adhesive after backing is peeled off) has the same curvature as the sample being tested. The sliding steel table is used to dampen vibrations in the drive mechanism and prevents them from being transmitted to the stroking arm.

PROCEDURES FOR HAZEMETER AND PHOTOMETRIC UNIT

The hazemeter is described in ASTM D1003-52 and its operation is described below. The hazemeter is turned on and allowed to warm up for a minimum of 30 minutes to allow the instrument to stabilize. The zero point of the Gardner Digital Photometric Unit (Mod. PG5500) is determined by adjustment of the zero point control with no sample in place and the lid shut. When digital display indicates 0.00, the correction for stray light has taken place and the instrument is zeroed to air.

The test specimen must be washed with a mixture of deionized water and a detergent (Liqui-nox) then dried using clean air or dry nitrogen. With the sample to be abraded in place the calibrate control unit is adjusted until the digital display indicates 100.00. This step corrects for the transmission of the sample. The sample is removed and the zero point (0.00) rechecked. If the zero point must be readjusted, then the steps of the proceeding two paragraphs have to be repeated until the zero point no longer needs adjustment. Once the zero point and 100% transmission have been equalized the sample is ready for the initial haze reading. This is the digital readout.

PROCEDURES FOR ABRADING SAMPLES

The felt pad with the adhesive back is attached to the correct holder which matches the curve of the sample to be abraded. A premeasured amount of grit (Grit #600, Silicon Carbide, Norton Company, Worcester, Mass.) is placed on the felt pad and spread over the surface of the pad evenly. The holder is then lightly tapped on the side until the abrasive grit settles into the felt pad.

The pad and holder is then positioned on the ball socket of the abrader arm and carefully lowered onto the sample to be abraded. The abrader counter is then set to a predetermined amount of cycles depending on the material to be tested. The abrader is turned on and the sample abraded the desired number of cycles. Once the sample has been abraded for the predetermined amount of cycles, the sample is removed from the abrader and washed and dried.

The sample is then placed in the hazemeter and a new haze reading to establish the increase in haze over the initial haze reading taken. This is done bringing the digital readout of the haze meter to 100.0 reading with the sphere in a cocked position, then back to the straight through position for the haze reading.

A typical set of readings would be as follows:

| Material | Initial Haze | Cycles | 2nd Reading | % Haze Increase |
|---|---|---|---|---|
| CR-39 Resin (15% PMMA) | 0.2% | 150 | 3.4% Haze | 3.2% |

It has been discovered in this invention that the electron beam post-treatment of the organosiloxane coating layer prepared from an organosilanol coating liquid affords a surprising increase in abrasion resistance. The resultant hard-coated plastic articles have abrasion resistance which is much greater than the typical abrasion resistance obtained by the dip coating of plastic articles with an organosilanol coating liquid and a subsequent curing thereof but without electron beam post-treatment. The degree of improvement of the abrasion resistance is so large that the resultant abrasion resistance approaches that of common glass. Thus, the present invention affords solid substrates coated with an organosiloxane coating having an abrasion resistance such that the number of cycles of abrasive motion required to increase the haze value of the solid substrate by 3% is at least 500 as determined by the rubbing pad abrader test method under 100 gram load. Under favorable conditions, abrasion resistance much higher than that can be obtained.

The following example is presented solely for the purpose of illustrating the invention. It should not be construed as limiting the scope of this invention.

EXAMPLE I

Two sunglass lenses made of poly(methylmethacrylate) were coated with an organosilanol coating liquid sold by General Electric Company under the designation SHC-1200 (See Frye U.S. Pat. No. 4,277,287 and Kray U.S. Pat. No. 4,298,655.) The lenses were dip-coated with the organosilanol coating liquid, air cured and then thermally cured at 185° F.

A commercial electron beam source, Model STIH-270-2, sold by Airco Temescal Company (Berkeley, Calif.) was placed inside a vacuum chamber. One of the sunglass lenses hard coated according to the above described procedure was placed in such a position that the electron beam emitted by the beam source would sweep over the entire face of the lens. At any given time, the size of the electron beam was about ¼ inch diameter, and the sweeping of the electron beam was accomplished by an internal mechanism of said beam source. The vacuum chamber pressure was maintained at about $1 \times 10^{-6}$ torr. The acceleration voltage was 5.5 kv, and the current was less than 10 mA. The irradiation time was two minutes. After the completion of the electron beam post-treatment, there was no appreciable discoloration or deformation of the sunglass lens.

The same post-treatment was repeated with the other hard-coated lens, except that the irradiation time was increased to 10 minutes.

The two sunglass lenses were subjected to the rubbing pad abrader test described earlier. The results are shown below together with that of a control sample, which is a sunglass lens made of the same material and coated with the organosiloxane coating according to the same procedure as the above two sample lenses, but has not been post-treated with electron beam. The range of the test results given for the control sample reflects the fact that many duplicate runs were conducted.

| | SAMPLE 1 (2 minutes post-treatment) | SAMPLE 2 (10 minutes post-treatment) | CONTROL |
|---|---|---|---|
| Haze increase after 125 cycles | 0.0% | 1.8% | 2.8–3.2% |
| Haze increase after 2625 cycles | 3.0% | not measured | not measured |

What is claimed is:

1. A method of improving the abrasion resistance of cross-linked organosiloxane coating, said coating having been prepared by applying to a solid substrate an organosilanol coating liquid comprising as a main ingredient organosilanol molecules, at least 90 mole percent of which being trifunctional silanols of the formula $RSi(OH)_3$ where R is a hydrocarbon radical, and at least 50 mole percent of said trifunctional silanols being an alkyltrisilanol of 1–3 carbons or phenyltrisilanol, or a precursor thereof or a partial hydrolysis product thereof and by curing the resultant coating in order to obtain an abrasion resistant, cross-linked organosiloxane coating, which method comprises an electron beam treatment of said cross-linked organosiloxane coating.

2. The method as defined in claim 1 wherein the electron beam treatment is conducted under a vacuum.

3. The method as defined in claim 1, wherein the acceleration voltage of the electron beam is from about 1 kv to about 20 kv.

4. The method as defined in claim 1 wherein at least 50 mole percent of the trifunctional silanols is methyltrisilanol.

5. The method as defined in claim 1 wherein at least 70 mole percent of the trifunctional silanols is methyltrisilanol.

6. The method as defined in claim 1, wherein the solid substrate is a plastic material.

7. The method as defined in claim 6, wherein the plastic material is selected from the group consisting of acrylic resin, polycarbonate resin, allyl diglycol carbonate resin, polyester resin, polyamide resin, polystyrene resin and cellulose ester resin.

8. The method as defined in claim 6, wherein the plastic material is selected from the group consisting of acrylic resin, polycarbonate resin, allyl diglycol carbonate resin and cellulose ester resin.

9. The method as defined in claim 2, wherein at least 50 mole percent of the trifunctional silanols is methyltrisilanol.

10. The method as defined in claim 9, wherein the plastic material is selected from the group consisting of acrylic resin, polycarbonate resin, allyl diglycol carbonate resin and cellulose ester resin.

11. A solid substrate coated with an abrasion-resistant cross-linked organosiloxane coating comprising the cross-linked condensation product of organosilanol molecules at least 90 mole percent of which being trifunctional silanols of the formula $RSi(OH)_3$ where R is a hydrocarbon radical, and at least 50 mole percent of said trifunctional silanols being an alkyltrisilanol of 1–3 carbons or phenyltrisilanol, a precursor thereof or a partial hydrolysis product thereof that has been electron beam treated subsequent to condensation and crosslinking.

12. The solid substrate as defined in claim 11, wherein the electron beam treatment is conducted under a vacuum.

13. The solid substrate as defined in claim 11, wherein the acceleration voltage of the electron beam is from about 1 kv to about 20 kv.

14. The solid substrate as defined in claim 11, wherein at least 50 mole percent of the trifunctional silanols is methyltrisilanol.

15. The solid substrate as defined in claim 11, wherein at least 70 mole percent of the trifunctional silanols is methyltrisilanol.

16. The solid substrate as defined in claim 11, wherein the solid substrate is a plastic material.

17. The solid substrate as defined in claim 16, wherein the plastic material is selected from the group consisting of acrylic resin, polycarbonate resin, allyl diglycol carbonate resin, polyester resin, polyamide resin, polystyrene resin and cellulose ester resin.

18. The solid substrate as defined in claim 16, wherein the plastic material is selected from the group consisting of acrylic resin, polycarbonate resin, allyl diglycol carbonate resin and cellulose ester resin.

19. The solid substrate as defined in claim 12, wherein at least 50 mole percent of the trifunctional silanols is methyltrisilanol.

20. The solid substrate as defined in claim 19, wherein the plastic material is selected from the group consisting of acrylic resin, polycarbonate resin, allyl diglycol carbonate resin and cellulose ester resin.

* * * * *